United States Patent

[11] 3,608,848

| [72] | Inventors | Myron A. Cantor<br>Rolling Hills;<br>Harry S. Greenberg, Tustin; Clifford H. Parks, Diamond Bar, all of Calif. |
|---|---|---|
| [21] | Appl. No. | 769,276 |
| [22] | Filed | Oct. 21, 1968 |
| [45] | Patented | Sept. 28, 1971 |
| [73] | Assignee | North American Rockwell Corporation |

[54] DOCKING MECHANISM
7 Claims, 8 Drawing Figs.
[52] U.S. Cl. .................................................. 244/1
[51] Int. Cl. ................................................... B64g 1/00
[50] Field of Search .................................... 244/1 SS, 1 SD

[56] References Cited
UNITED STATES PATENTS

| 3,193,213 | 7/1965 | Eberwine ...................... | 244/1 SD |
| 3,201,065 | 8/1965 | Dunn ............................. | 244/1 SD |
| 3,391,881 | 7/1968 | Maltby ......................... | 244/1 SD |
| 3,443,773 | 5/1969 | Blumrich et al. .............. | 244/1 SD |

Primary Examiner—Milton Buchler
Assistant Examiner—Jeffrey L. Forman
Attorneys—William R. Lane, Allan Rothenberg and Richard D. Seibel ABSTRACT: A mechanism is described for aligning and securing two vehicles and attenuating shock upon impact therebetween. A plurality of wedge-shaped or semipyramidal bumpers are yieldably mounted on one vehicle and adapted to mate with complementary receptacles on the other vehicle. Sloping faces on the wedge-shaped bumpers resolve or redirect impact forces for shock attenuation by a single set of shock absorbers. Docking latches are provided for securing the vehicles together and an assembly latch arrangement is provided for holding the vehicles spaced apart for a minimum heat transfer or alternatively drawing the vehicles together for operation.

INVENTORS.
MYRON A. CANTOR
HARRY S. GREENBERG
BY CLIFFORD H. PARKS

ATTORNEY

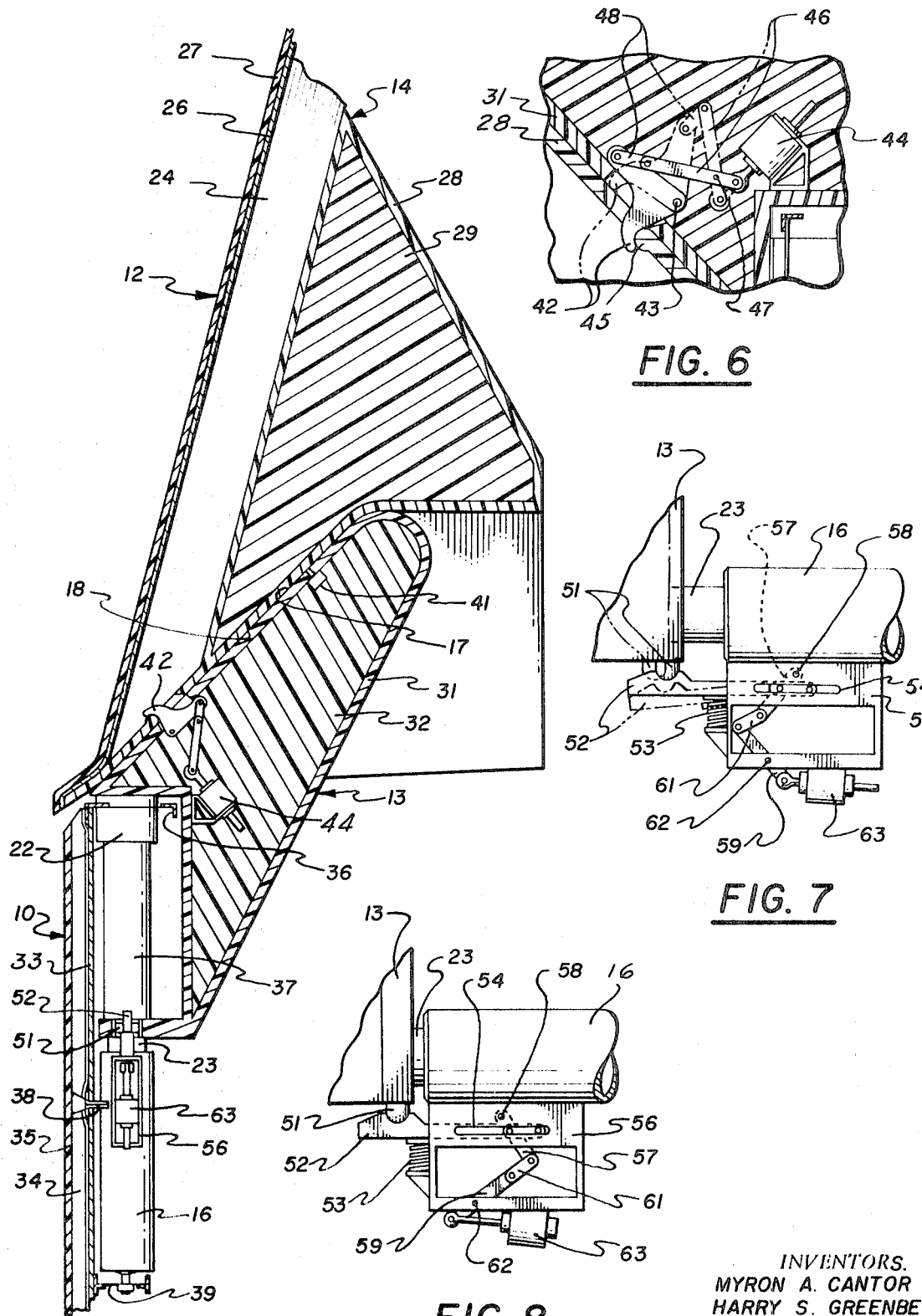

DOCKING MECHANISM

BACKGROUND

Space missions requiring large amounts of propellant or involving the assembly of large structures or vehicles in space stretch the capabilities of existing launch vehicles. It is desirable to have two or more launches of vehicles into earth orbit with subsequent rendezvous of the vehicles and docking together for subsequent space operation. A typical mission of this sort involves an interplanetary flight for a heavy spacecraft wherein a large booster filled with cryogenic fuel such as liquid hydrogen is placed in earth orbit. Subsequently, a vehicle including a payload is placed in orbit and rendezvoused with the booster or a fuel-loader "tanker." These two vehicles are carefully brought together and docked. After docking the joined vehicles may remain in earth orbit for a period while additional tanker vehicles rendezvous and dock to provide additional propellant. When a suitable position is reached for boosting into an interplanetary trajectory the propellant in the booster is employed to inject the payload vehicle into an interplanetary trajectory and the booster is thereafter jettisoned. An alternate mission may involve joining several vehicles to build a space station.

A critical element in the above-described missions is the docking and mating of two or more large, heavy masses prior to operation.

Two broad types of docking have been considered for space vehicles, soft and hard. In soft docking the two vehicles are brought into close proximity with substantially the same velocity but without actual contact. Some type of a small probe is then sent from one vehicle to the other and the probe is initially docked to the second vehicle. After this a line between the probe and the sending vehicle is employed to slowly reel the two vehicles together for a soft or low-impact docking. With such an arrangement the forces involved in the docking of the two vehicles are relatively small. In hard docking, on the other hand, the two vehicles are brought into close proximity and substantially the same velocity and are then brought together by means of small rockets on one or both of the vehicles. In hard docking substantial impact forces are possible and the shock of impact must be attenuated.

In addition to the forces involved due to the difference in velocity between the two vehicles upon hard docking, forces are also involved in final alignment of the vehicles prior to secure mating. As the two vehicles are brought together certain errors in alignment must be accommodated and means provided for bringing the vehicles into alignment with minimum weight and size penalties. As the two vehicles approach each other the axes of the two vehicles may be aligned in the same direction but one may be displaced laterally from the other. Likewise, the axes may be tilted so as to not be parallel and unless the two vehicles are completely symmetrical they may be rotated to some degree about the axis. Thus the two vehicles may approach each other with errors in position in two directions and there may be misalignment in roll, pitch, and yaw.

A number of docking mechanisms have been proposed for space vehicles involving conical male probes and mating conical female "drogues." These docking mechanisms have a plurality of shock absorbers arranged at various angles for accommodating misalignment between the two vehicles. Such arrangements are suitable for small vehicles since no great weight penalty is involved in providing sufficient structural rigidity and alignment capability. In the case of large boosters, however, the conventional docking mechanisms are unsuitable since they would be prohibitively heavy. For like structures to take the loads involved in docking large vehicles such as boosters or tankers, the necessary mechanisms would be too large and complex and involve a substantial weight penalty.

SUMMARY OF THE INVENTION

Thus in the practice of this invention according to a preferred embodiment there is provided a docking mechanism having a plurality of sets of complementary docking members having camming surfaces for redirecting roll, pitch, yaw and translation deviations between the two vehicles into translation of one of the docking members in a single direction.

DRAWINGS

Many of the attendant advantages of this invention will be readily appreciated as the same becomes better understood by reference to the following detailed description when considered in connection with the accompanying drawings wherein:

FIG. 1 illustrates a space booster and mating structures constructed according to the principles of this invention;

FIG. 2 comprises a perspective view of a portion of the booster and mating spacecraft partly cut away to show the docking mechanism;

FIG. 4 is a cross section view of one of the sets of members of the docking mechanism after mating;

FIG. 6 is a detail view of a docking latch;

FIG. 7 is a detail view of an assembly latch in an intermediate position; and

FIG. 8 illustrates the assembly latch of FIG. 7 in the final position.

Throughout the drawings like reference numerals refer to like parts.

Figure 1:
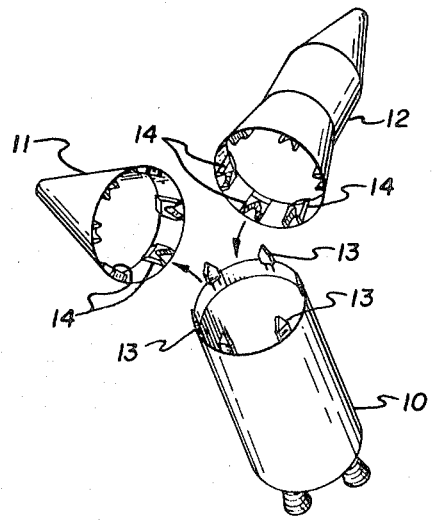

There are five principal areas of concern in hard docking of large vehicles: alignment, engagement, heat transfer, stability and separation.

There are two areas of interest in aligning vehicles, axial and roll. Roll positioning is of significance for the alignment of umbilical connectors between the two vehicles for transferring storable materials, electrical energy or control signals. Unless the umbilicals are on the vehicle centerlines, roll control is required and it is usual that the several connections must be made and the vehicles must be aligned in roll for use. Axial alignment includes both translation along and rotation about axes transverse to the vehicle roll axis. Rotation about these axes are commonly known as pitch and yaw. Axial alignment requirements are a function of the size of the structures and the vehicle control tolerances. In both roll and axial alignment the larger the structure, the less precise the alignment requirements, but the larger the volume of the docking structure and the greater the weight.

With a rigid structure, precise vehicle alignment is required before docking or the docking structure would have to be extremely heavy to withstand the impact loads. Lighter support structures and broader tolerances are acceptable if a shock-absorbing system is provided to reduce impact loads. Likewise means must be provided for taking tension loads after initial engagement to hold the vehicles together.

When a booster utilizing cyrogenic propellent is docked to another spacecraft there will be a conduction heat transfer from the spacecraft to the cryogenic propellant tanks on the booster with consequent boiloff or propellant. This can be reduced by insulating between the vehicles, by connecting them with low-condition materials, by minimizing connection area or by spacing the vehicles apart. In practice of this invention according to a preferred embodiment all four of these techniques are employed. After coarse alignment and engagement the vehicles are temporarily held apart and later brought together to take the heavy compression loads during boost.

Best stability of the two vehicles is achieved if rigid docking mechanisms are provided at the perimeter of the vehicles. If three or more docking points are employed, the vehicles need only be latched together and the docking system provides adequate stability without the use of additional struts. Peripheral stabilizing struts would be needed if the docking mechanism were appreciably smaller than the vehicle diameter. Also by providing the docking members at the perimeter of a cylindrical vehicle, good transfer of loads to the vehicle structure is obtained. Such vehicles conventionally have the shell of the fuel tanks serving as the primary structure and arranging the docking members at the perimeter requires no extensive connecting structure.

Previously, many separation systems for large vehicles have provided a pair of joints, one for docking connection and another for separation, the latter usually having a tension tie severed by an explosive device. This requires duplication of frames, stiffeners and the like with consequent complexity and weight. The complex separation joint is avoided when the docking joint is utilized for separation.

FIG. 1 illustrates a vehicle such as a space booster 10 having a docking mechanism incorporating the principles of this invention. As illustration in this embodiment the space booster may be injected into an earth orbit carrying an aerodynamic shroud 11 to assist in its passage through the atmosphere. Upon reaching an earth orbit the aerodynamic shroud is jettisoned as indicated by the arrow and thereafter a second space vehicle 12 is rendezvoused with the booster 10 for docking therewith for an interplanetary mission, for example. It will be apparent, of course, that the aerodynamic shroud is ejected a substantial time and distance from the spacecraft 12 rather than in the close proximity shown in FIG. 1 so that there is no danger of a collision therebetween.

Figure 2:
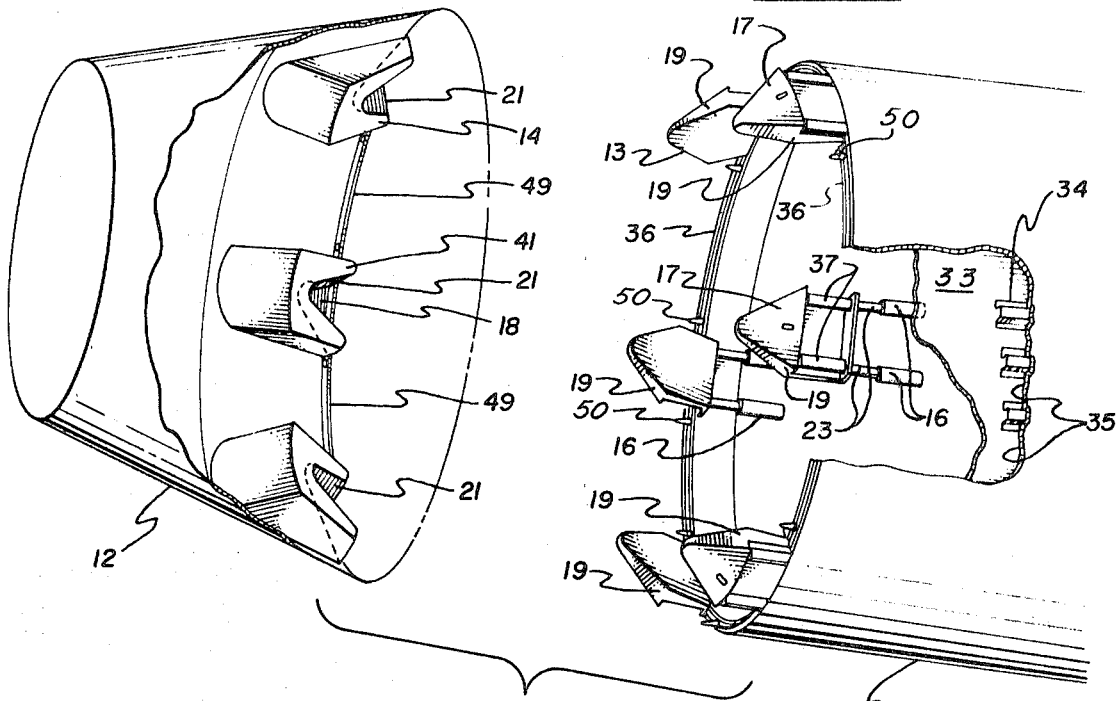

On the forward part of the space booster 10 six wedge-shaped bumpers 13 are provided in a circular array around the vehicle periphery as shown in greater detail in FIG. 2. Six mating receptacles 14 for the bumpers are provided on an internal surface of the space vehicle 12 each of said bumpers mating with a receptacle to form a set of docking members as pointed out in greater detail hereinafter. Similar receptacles 14, although of lighter construction, are provided on the shroud (FIG. 1) for use during boost and the shroud is unlatched in the same manner as the spacecraft, as pointed out in greater detail hereinafter. Although the described embodiment employs six sets of docking members, it will be apparent that more or fewer may be employed with a minimum of three being required for stability without additional structures. The bumpers 13 on the booster are each mounted on two shock absorber struts 16 for motion relative to the booster 10 and are therefore active members of the sets of docking members. The receptacles on the other hand, are fixed to the spacecraft 12 and are therefore passive members of the set. It should be apparent that the roles of bumpers and receptacles could be reversed with the bumpers being passive and the receptacles active, or shock attenuators could be provided on both members. Two shock absorbers are employed for each bumper to accommodate forces tending to twist the bumper, so that loads are transferred to the vehicle structure without substantial shear.

Each of the six bumpers in the circular array around the end of the booster has an external surface 17 in the form of a segment of a conical surface. The conical surface defined by the external surfaces 17 has an apex half angle of 45°. That is, a line from the imaginary apex of the cone along one of the external faces 17 intersects the axis of the cone (or the side of the cylindrical booster) at an angle of 45°. Each of the six receptacles 14 in the circular array within the base of the spacecraft 12 has a face 18 exactly complementary to the external face 17 on the bumper. Thus the face 18 on the receptacles is also a segment of the surface of a 45° cone.

Each of the bumpers 13 also has a pair of side faces 19 that are substantially normal to the external faces 17 and diverge from each other at about 90°. Thus each of the individual faces 19 on the bumpers is at a 45° angle to the axis of the booster. The radial side faces 19 are rays from the vehicle centerline. Thus, collectively, the faces 19 and face 17 on the bumpers form a portion of a pyramidal wedge with three sides sloping at 45°. The receptacles 14 on the spacecraft have side surfaces 21 complementary to the side faces 19 on the bumpers so that when mated the bumpers fit closely within the receptacles.

Figure 3:
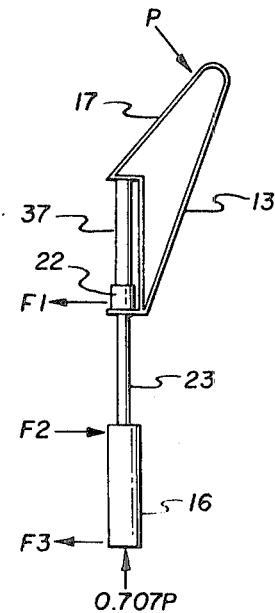
FIG. 3 illustrates schematically typical loads on one of the bumpers as illustrated in FIG. 2.

The reason for 45° faces on the semipyramidal bumpers and matching faces on the receptacles becomes clear upon an examination of FIG. 3 which illustrates schematically one of the bumpers 13 and the external 45° face 17. A docking force P is assumed to be applied to the 45° face 17 at a direction normal thereto. It will be apparent that this angle of the docking force assumes that there is no friction on the docking surface. As a matter of practice the principal velocity difference between a bumper and its receptacle will be along the axis of a vehicle and the surfaces will have a real coefficient of friction, albeit low, and therefore the direction of application of the principal docking force P will be more along the axis of the vehicle; that is, more vertically in FIG. 3. Even assuming application of the docking force P normal to the 45° surface 17 will be apparent that this force is resolved into two components each equal to 0.707P (1 2).

As will appear in further detail hereinafter each bumper 13 is connected to the structure of the booster at three points (actually six since there are two shock absorbers per bumper). A sleeve 22 is connected to the booster and the bumpers if free to slide therein in a direction parallel to the booster axis. The shock absorber 16 is connected at each end thereof to the structure of the booster and loads are transmitted from the bumper 13 to the shock absorber 16 by way of piston 23 of the shock absorber. The lateral component of the docking force P is transmitted to the structural frame of the booster as a series of forces F1, F2, and F3 at the sleeve 22 and the outboard and inboard ends of the shock absorber 16, respectively. Three lateral reacting forces rather than two are involved since the combination of piston 23 and cylinder 16 and the structural frame of the booster itself are not completely rigid members. The other component of the docking force P is parallel to the axis of the booster and is reacted by a force of 0.707P along the axis of the shock absorber 16. Application of a docking force therefore strokes the shock absorber for attenuation of the relative kinetic energy between the two vehicles.

If the docking force P is applied laterally on the bumper face 17, that is at 45° thereto and horizontally in FIG. 3, there is still a resolution of this force into forces side loaded on the booster structure and a force for stroking the shock absorbers. With a coefficient of sliding friction of about 0.10, the reaction stroking the shock absorber is 0.64 and the lateral reaction force on the booster is 0.78P. It is apparent that the strength and stiffness of the mechanical connections and the capacity of the shock absorber can readily be designed to accommodate any desired magnitude of loading and coefficient of friction.

The effect of the 45° camming surfaces on the bumpers can be readily visualized by placing an ordinary 45° drafting triangle on a smooth surface with one short edge against an immovable edge. A ruler or similar object pressed against the hypotenuse of the triangle at substantially any angle causes the triangle to slide in the direction of the other short edge.

Although the analysis of FIG. 3 has been related for the 45° face 17 on the bumper it will be apparent that a similar effect occurs on the side faces 19 and that docking loads against any face of the bumper are resolved into forces transmitted to the booster structure and a force directed to stroking the shock absorbers for impact attenuation.

The sloping sides of the semipyradimal sets of docking members assures that the shock absorbers are actuated longitudinally for any direction of application of load.

FIG. 4 illustrates in greater detail a bumper 13 fully mated with a receptacle 14 including latches and other structural details. The receptacle 14 is mounted on a structural rib 24 of the spacecraft 12 and the skin 26 of the spacecraft is mounted on the opposite side of the rib 24. A layer of thermal insulation 27 is provided on the outside of the skin 26 for minimizing heat transfer and consequent vaporization of cyrogenic propellents. The receptacle itself is in the form of a hollow shell 28 which is preferably formed of glass fabric reinforced plastic or may be of metal. The interior of the receptacle is preferably reinforced with conventional plastic honeycomb material 29 for treater rigidity. In considering the structure of the bumper and other elements of the docking mechanism illustrated, the massive size of the structure should be recalled. Thus, for example, in a 33-feet-diameter booster the distance from the skin line of the booster to the innermost portion of the receptacle is approximately 5 feet. The thickness of the shell 28 of the receptacle may be one-half inch or more. The same is true for the bumper 13 which has an outer glass fabric reinforced resin shell 31 and an internal core of honeycomb laminate 32. If analysis indicates that an inordinately heavy structure would result, a ribbed or waffle structure can be employed in lieu of the monocoque shell illustrated.

The booster 10 has an aluminum skin 33 reinforced by hat section stringers 34 running longitudinally along the vehicle. A layer of thermal insulation 35 is provided over the skin and stringers for minimizing heat transfer and conserving cyrogenic propellants. An internally extending flange 36 is provided at the forward end of the booster and structurally connected to the skin for carrying the load of boosting to forward stages such as the shroud 11 or payload 12.

The bumper 13 is connected to the structure of the booster in such a way that it can move longitudinally relative to the booster under the forces of docking. The sleeve 22 is rigidly connected to the flange 36 at the forward end of the booster. A rod 37 is rigidly connected to the bumper and is free to slide in the sleeve 22 as mentioned hereinabove. The bumper is also connected to a piston rod 23 which actuates the piston in the hydraulic or pneumatic shock absorber 16. The cylinder of the shock absorber is secured to the structure of the booster by way of internal flanges and gusset 38 at the outboard end and by way of an internally extending flange 39 at the inboard end. If desired the shock absorber cylinders may be mounted in phenolic blocks or the like and these mounted to the booster structure for minimizing heat transfer. Thus, recalling the nomenclature of FIG. 3, the component of the docking force F1 is transferred to the structure of the booster by way of the sleeve 22 and flange 38, and the force F3 is transferred to the structure by way of the flange 39. In addition, the longitudinal component of the docking force along the stroke of the shock absorber 16 is transferred to the structure principally at the flange 39 and partly at the flange 38.

Figure 5:
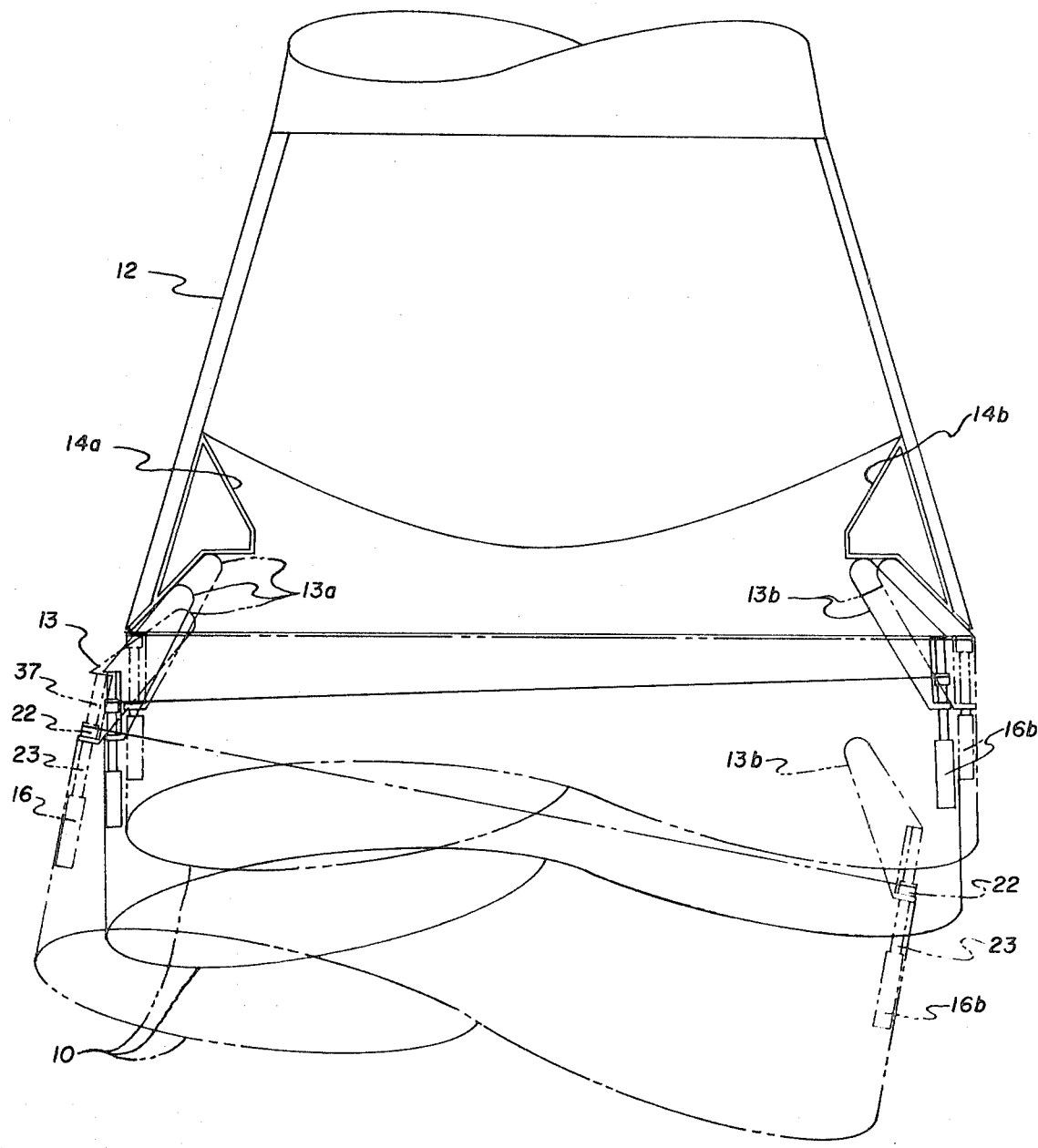
FIG. 5 illustrates three stages of vehicle alignment in a typical docking situation.

FIG. 5 illustrates a docking situation with the two vehicles shown in the position with maximum permissible maneuvering tolerances for the illustrated booster. Typically in a booster 33 feet in diameter an axial offset of about ±1.5 feet is acceptable and an angular deviation of about ±10° in roll is acceptable, however, this is not illustrated in FIG. 5. It will be understood, of course, that similar stroking of the shock absorbers and alignment of the two vehicles occurs in roll as in the pitch and axial offset tolerances illustrated in FIG. 5. To accommodate the acceptable tolerances, the bumpers and receptacles are 20° wide to permit ±10° of roll misalignment. The receptacles are long enough radially to permit not only a maximum of ±10° angular (pitch) misalignment, but ±18 inches translation as well. These docking tolerances can be increased or decreased by merely increasing or decreasing the size of the receptacles as required. In order to obtain the same tolerances with continuous rings and frames or conical probes, the weight would have been approximately three times as great as the preferred structure.

In the illustration of FIG. 5 it is assumed that the spacecraft remains stationary and the booster moves relative thereto. It is apparent that both vehicles will be moving in reaching alignment upon docking; however, since only the relative motion between the two vehicles is of concern the actual motion of the two vehicles unimportant for the illustration of FIG. 5. In this figure the position of the booster and bumpers before engagement is shown in phantom, an interim position during engagement is shown in solid, and the final position of the two vehicles when docked is also shown in phantom for optimum clarity.

At the first contact of the booster 10 and spacecraft 12 the bumpers 13 are fully extended with the full stroke of the shock absorbers 16 available for docking load attenuation. In a 33-foot-diameter booster the full stroke of the shock absorbers may be in the order of about 2 feet. The first 15 inches or so of the shock absorber travel is for shock attenuation and the remaining 8 or 9 inches represents a safety factor to prevent the vehicle frames from hitting each other when the two are inclined at 10° and translated 18 inches. With the assumed angular misalignment and axial offset as illustrated in FIG. 5, the lower bumper 13a first contacts the lower receptacle 14a thereby causing the booster to rotate relative to the spacecraft to bring the two vehicles into angular alignment. At the same time some of the relative kinetic energy of the two vehicles is attenuated by the shock absorbers 16a. The booster continues to rotate into angular alignment until the upper bumper 13b contacts the receptacle 14b at which time the vehicles are approximately aligned with the axes offset as illustrated in the interim position shown solid in FIG. 5. Some of the energy of the docking is attenuated in the shock absorbers 16b as contact is made by the upper bumper. Further advancement of the booster into the spacecraft slides the lower bumper 13a along the angled surface of the lower receptacle 14a to shift the axes of the two vehicles into alignment. At the same time the upper bumper 13a slides across the upper receptacle 14b toward the final mated position shown in phantom in FIG. 5. Additional stroking of the shock absorbers 16a and 16b may occur during this final adjustment in position to attenuate the balance of the kinetic energy differences. It will be recognized, of course, that the sliding and rotation of the two vehicles relative to each other may not occur as separate steps but will in most instances occur substantially concurrently, and that alignment in roll will also be occurring. It will be apparent that this docking has been exemplified with two bumpers at the top and bottom of a circle, and that all of the bumpers and associated structure actually participates in the docking.

When the bumpers are fully seated in the receptacles as in the final position in FIG. 5 and as illustrated in FIG. 4, the two vehicles are secured together by latches. Two or three switches 41 are provided on each of the bumpers to indicate when the bumpers are fully seated. One of the switches 41 is shown on the slanting face 17 of the bumper in FIG. 4 and this switch is actuated by the slanting face 18 on the receptacle when the face 17 is in close engagement therewith. Similar switches (not shown) are provided on the side faces 21 of the bumpers for detecting close engagement of the side faces with the mating faces of the receptacle. When the three faces of the bumper are in close engagement with the receptacle the bumper is fully seated and the consequent closure of the three switches 41 provides a signal that activates a docking latch for securing the bumper to the receptacle.

A typical docking latch arrangement involving an over-center linkage is illustrated in FIG. 6. As illustrated in this embodiment a bell crank like latch member 42 is mounted on a fixed pivot 43 for pivoting between a position completely within the bumper 13 as shown in phantom to an extended position in engagement with the receptacle 14 as shown solid in FIG. 6. A solenoid 44 or similar actuator is mounted in the bumper with the armature connected to a link 46 which is pivoted about a fixed pivot 47 between the ends of the link. The opposite end of the link 46 is connected to the latching member 42 by a free link 48 which has ends connected by pivots to the link 46 and latching member 42, respectively. Upon actuation of the solenoid 44 for engaging the latch the armature of the solenoid is retracted thereby swinging the link 46 about the fixed pivot 47, thereby pushing the free link 48 and hence the latching member 42, which pivots through apertures in the bumper 13 and receptacle 14 for securing these two together by an end of the latching member engaging a lip 45 on the receptacle. Extension of the armature of the solenoid 44 reverses the swinging action and unlatches the latching member 42 for disconnecting bumpers on the booster from receptacles on the aerodynamic shroud or the spacecraft.

The latch between each bumper and receptacle is actuated when the two docking members of that set are seated. However, it will be recognized that at this point in docking the two vehicles may still be separated because some of the shock absorbers 16 have not fully stroked, as would be the case when less than the maximum acceptable difference in velocity was present in the docking maneuver. The shock absorbers on the six bumpers are almost certainly not uniformly stroked since the energy attenuated in each will depend on the initial misalignments. Thus, after latching the bumpers and receptacles together, the hydraulic or pneumatic shock absorbers are operated as actuators or motors by pumps, stored energy, or the like (not shown) for driving the bumpers toward the fully stroked position. This draws the spacecraft and booster towards each other for final assembly.

As mentioned hereinabove, for many missions it may be desirable to dock the spacecraft and booster and then remain in earth orbit for an appreciable period before interplanetary injection. During this period of hold in earth orbit it is desirable to minimize heat transfer between the booster and the spacecraft for minimizing the loss of cryogenic propellents. Means are therefore provided in the docking mechanism for bringing the vehicles to a fixed, spaced-apart position for minimum heat transfer. Means are further provided for finally drawing the vehicles together into an assembled position when it is desired to use the booster for interplanetary injection or the like. At that time the two vehicles are brought into intimate contact with the flange 36 on the booster mating with a similar flange 49 (FIG. 2) on the spacecraft for load transfer therebetween. Short taper pins 50 on the flange 36 assure final close alignment of the two vehicles as they are brought together for boost, and take any shear loads between the booster and spacecraft during boost.

An assembly latch as illustrated in FIGS. 7 and 8 is provided for holding the two vehicles in spaced-apart relation for earth orbit or the like, and drawing the two vehicles together for interplanetary boost. A cylindrical detent 51 is provided on the bumper 13 at the inboard end thereof. A latch arm 52 engages the detent 51 when the shock absorber 16 is stroked to within about 2 inches of the end. As the shock absorber is stroked toward the fully stroked position the end of the latch arm 52 is cammed outwardly by the detent as shown in phantom in FIG. 7, depressing the latch spring 53. Further retraction of the piston rod 23 of the shock absorber engages the detent with the latch arm 52 to stop the piston rod about 2 inches from the end of the stroke for securely holding the bumper in position. At this point the shock absorbers are all locked by their respective assembly latches and the two vehicles are secured together in a stabilized position. The connection is sufficiently strong to accommodate the minor forces involved in attitude control of the vehicles in orbit and the vehicles are physically spaced apart a small distance for minimizing heat transfer therebetween. The vehicles are held in spaced-apart relation during earth orbit and are pulled together the last few inches for boost.

In order to draw the vehicles together, the bumper is further retracted towards the booster by the assembly latching mechanism. The latch arm 52 of the assembly latch is free to move longitudinally along a groove or slot 54 in the side of a housing 56. The housing 56 is secured to the side of the shock absorber 16; that is, it is fixed relative to the structure of the booster. An overcenter linkage controls the position of the latch arm 52. The latch arm is connected to an intermediate portion of a link 57 which is pivoted about a fixed pivot 58. The other end of the link 57 is in turn connected to the end of a driver link 59 by a free link 61. The driver link 59 is pivoted between its ends at a fixed pivot 62 and the other end of the driver link is connected to the armature of a solenoid 63 or other similar actuator. When the armature of the actuator is retracted the linkage is pivoted to a position as illustrated in FIG. 7 with the latch arm 52 fully extended.

Upon extension of the armature of the solenoid 63 as illustrated in FIG. 8 the driver link 59 is pivoted about the fixed pivot 62, thereby swinging the free link 61 so as to cause the link 57 to pivot about its fixed pivot 58 and slide the latch arm 52 longitudinally along the slot 54. The latch arm operation on the detent 51 draws the bumper toward the booster and fully strokes the shock absorber 16. This brings the load carrying flanges 36 and 49 (FIG. 2) in engagement so that the high loads created by use of the booster are transferred to the spacecraft for boosting into an interplanetary trajectory.

After the booster is used it may be desired to keep it attached to the spacecraft for a later use, in which case the action of the assembly latch is reversed with the solenoid armature being retracted and the above described linkage operating in reverse to extend the latch arm 52. This separates the booster and the spacecraft a fixed distance, for example, about 2 inches, and holds them securely in this relation for minimum heat transfer.

When the cryogenic propellant in the booster is exhausted, it may be desired to jettison the booster, in which case each of the docking latches is retracted by extending the armature of the solenoid 44. This frees the receptacles from the bumpers and the two vehicles can travel in separate paths. The force to separate the vehicles is conveniently provided by the attitude control rockets of the spacecraft or booster, or may be provided by extending the assembly latch arms 52 to give a small push to the spacecraft. It should be apparent that jettisoning of the aerodynamic shroud 11 is provided in substantially the same manner.

It is to be understood that many modifications and variations may be made in light of the above teachings. Thus, for example, cams and similar locking arrangements may be employed on the docking and assembly latches to assure positive action in addition to or in lieu of the over center linkage described and illustrated. Likewise, in order to obtain greater separating thrust, the assembly latches can be disconnected upon separation of the docking latches and the shock absorbers stroked their full length to push the spacecraft and booster apart. It will also be appreciated that this invention is applicable to docking of vehicles of various geometries, sizes, shapes or cross sections. There is described herein an embodiment particularly suited to vehicles having circular docking portions. Other arrangements may be provided, particularly in assembly of space structures.

What is claimed is:

1. A docking mechanism for hard docking of vehicles comprising:
    a passive docking member disposed on said first vehicle;
    an active docking member disposed on said second vehicle, said active docking member having a portion complementary with said passive docking member for mating therewith, and first latch means for releasably connecting said first and second docking members;
    shock absorbers disposed for absorbing impact loads between said active and passive docking members;
    means for holding said first and second vehicles in a spaced-apart position and for drawing said active docking member towards the second vehicle to place said first and second vehicles in touching position;
    latch means for holding said active docking member in the fixed locations relative to said second vehicle;
    one of said docking members comprising:
    a plurality of receptacles spaced in a circle around a portion of one of the vehicles;
    each of said receptacles having a first surface in the form of an approximately triangular segment of a conical surface, said first surfaces of said plurality of receptacles collectively defining a cone;
    each of said receptacles further having second and third surface portions, each approximately normal to said conical surface, said second and third surfaces converging towards each other to form, with said first surface, a three-cornered pocket or wedge-shaped cavity; and
    the other of said docking members comprising:

a plurality of semipyramidal bumpers spaced in a circle around a portion of the other of said vehicles, said bumpers having surface portions complementary to said receptacles so that said bumpers each mate with a receptacle upon docking of said first and second vehicles.

2. A docking mechanism as defined in claim 1 wherein said first latch means comprises:
a latching receptacle in the first conical surface of each of one of said docking members; and
a latch member on the first conical surface of each of the other of said docking members, each of said latch members connectable to one of said latching receptacles.

3. A docking mechanism having complementary members on first and second vehicles, said mechanism comprising:
a plurality of bumpers in the form of semipyramids on said first vehicle;
a plurality of receptacles on said second vehicle complementary to said bumpers for mating therewith;
means for attenuating docking shock on mating of said bumpers and receptacles, said means for attenuating shock being aligned along a vehicle axis;
said bumpers each including an external face in the form of a segment of a cone having an apex cone half angle of approximately 45°, said bumpers each lying on the surface of a common imaginary cone; and
a pair of side faces mutually diverging at approximately 90° and being segments of surfaces generated by rays extending from the axis of the common imaginary cone so that said external face and said side faces collectively form an approximately 45° semipyramid.

4. A docking mechanism having complementary members on first and second vehicles, said mechanism comprising:
a plurality of bumpers in the form of semipyramids on said first vehicle;
a plurality of receptacles on said second vehicle complementary to said bumpers for mating therewith;
said bumpers including an external face in the form of a segment of a cone having an apex half angle of approximately 45°, said bumpers each lying on the surface of a common imaginary cone;
a plurality of fluid shock absorbers aligned with the vehicle structure,
each of said bumpers being mounted on at least one of said shock absorbers for motion only in the direction of the vehicle axis;
first latch means for securing said bumpers to their respective receptacles;
second latch means for arresting stroke of said shock absorbers at a position intermediate between a position with the bumpers fully extended and a position with the bumpers fully retracted; and
means for retracting said second latch means for retracting said bumpers and drawing the vehicles together.

5. A docking mechanism as defined in claim 4 wherein said first latch means comprises:
a docking latch member,
a reversible actuator, and
an overcenter linkage interconnecting said docking latch member and said actuator for engaging and disengaging said latch member in response to said actuator; said second latch means comprises:
a detent connected to said bumper, and
an assembly latch member engageable with said detent at said intermediate position; and said means for retracting comprises:
a reversible actuator secured to the vehicle structure, and
an overcenter linkage interconnecting said assembly latch member and said actuator for shifting said assembly latch member between said intermediate position and a retracted position.

6. A docking mechanism for hard docking of two vehicles comprising:
a plurality of first docking members on a first vehicle;
a plurality of second docking members on a second vehicle, said second docking members being complementary to said first docking members for mating therewith;
shock absorber means interconnecting each of said docking members with said second vehicle for attenuating impact shocks between said first and second docking members, said shock absorber means being arranged for parallel travel; and
said first and second docking members having complementary camming surfaces for redirecting impact shocks due to roll, pitch, yaw and axial translation deviations between said two vehicles into travel of said second docking member in the direction of travel of said shock absorber means;
said docking members being arranged in a circular array on each of the vehicles and collectively occupying substantially less than the perimeter of the circular array; and
said first docking members each having an externally facing camming surface in the form of a segment of a cone common to the externally facing camming surface on the other of said first docking members.

7. Docking apparatus for first and second vehicles having docking peripheries on ends thereof to be joined comprising:
a plurality of docking devices spaced about the peripheries of each of the vehicles and shaped to effect coarse alignment of the vehicles upon initial engagement;
at least a portion of said docking devices including means for absorbing engagement shock and means for initially latching the devices of the first vehicle to devices of the second vehicle at a spaced-apart distance between said vehicles;
means for causing the devices of one of the vehicles to draw the vehicles toward each other and for latching them together at a second, spaced-apart distance between said vehicles;
means for further drawing the vehicles together in adjoining relation and locking the vehicles in such a relation;
said docking devices each having complementary sets of docking members on said first and second vehicles respectively, one of said docking members in each set comprising an approximately 45° semipyramid; and
said means for absorbing engagement shock comprising a pair of shock absorbers interconnecting each of said semipyramids and said first vehicle, said shock absorbers being aligned normal to the docking periphery.